(12) United States Patent
Son (10) Patent No.: US 8,595,339 B2
(45) Date of Patent: Nov. 26, 2013

(54) NETWORK MANAGEMENT APPARATUS AND METHOD

(75) Inventor: Kyoung-ho Son, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1739 days.

(21) Appl. No.: 11/266,571

(22) Filed: Nov. 4, 2005

(65) Prior Publication Data

US 2006/0101138 A1    May 11, 2006

(30) Foreign Application Priority Data

Nov. 5, 2004  (KR) .................... 10-2004-0089896

(51) Int. Cl.
*G06F 15/16*    (2006.01)
*G06F 15/173*    (2006.01)

(52) U.S. Cl.
USPC ............. 709/223; 709/202; 707/909.102; 707/999.103

(58) Field of Classification Search
USPC .................................................. 709/223
See application file for complete search history.

(56) References Cited

U.S. PATENT DOCUMENTS

| | | | | |
|---|---|---|---|---|
| 5,471,617 A * | 11/1995 | Farrand et al. | ............... | 718/100 |
| 5,913,037 A | 6/1999 | Spofford et al. | | |
| 6,009,431 A * | 12/1999 | Anger et al. | ................... | 707/10 |
| 6,018,567 A | 1/2000 | Dulmann | | |
| 6,219,703 B1 * | 4/2001 | Nguyen et al. | ............... | 709/224 |
| 6,363,421 B2 * | 3/2002 | Barker et al. | ................. | 709/223 |
| 6,754,703 B1 * | 6/2004 | Spring | ........................ | 709/223 |
| 2002/0091809 A1 * | 7/2002 | Menzies et al. | ............... | 709/223 |
| 2002/0097721 A1 * | 7/2002 | McKenzie et al. | ............ | 370/392 |
| 2003/0145069 A1 | 7/2003 | Lau et al. | | |
| 2004/0122922 A1 * | 6/2004 | Da Palma et al. | ............. | 709/223 |
| 2004/0210650 A1 * | 10/2004 | Babu | ............................ | 709/223 |

FOREIGN PATENT DOCUMENTS

| | | |
|---|---|---|
| EP | 0 963 076 A2 | 12/1999 |
| JP | 04-021147 A | 1/1992 |
| JP | 8-181772 A | 7/1996 |
| JP | 11-205320 A | 7/1999 |
| KR | 2002-0078758 A | 10/2002 |

OTHER PUBLICATIONS

Kyung Deok Seo and Choong Seon Hong "An Efficient Service Management Architecture in Virtual Active Network Using Script MIB".

* cited by examiner

*Primary Examiner* — Noel Beharry
(74) *Attorney, Agent, or Firm* — Sughrue Mion, PLLC

(57) ABSTRACT

A network management apparatus and method are provided to easily manage devices that are dynamically added to a network and yet maintain an existing network management structure. The network management apparatus includes a device connection management unit which determines whether to extend a predetermined management information base (MIB) according to an object identifier (OID) of a device connected to a network, and a virtual MIB connection unit which creates an object 'virtual' in the predetermined MIB according to the determination results provided by the device connection management unit, creates a virtual object for the device under the object 'virtual', assigns a serial number to the virtual object for the device according to a time in which the device has been connected to the network, and redefines the OID of the device according to the serial number.

8 Claims, 7 Drawing Sheets

NETWORK MANAGEMENT APPARATUS AND METHOD

CROSS-REFERENCE TO RELATED APPLICATION

This application claims priority from Korean Patent Application No. 10-2004-0089896 filed on Nov. 5, 2004 in the Korean Intellectual Property Office, the disclosure of which is incorporated herein by reference in its entirety.

BACKGROUND OF THE INVENTION

1. Field of the Invention

The present invention relates to a network management apparatus and method, and more particularly, to a network management apparatus and method, which can easily manage devices that are dynamically added to a network and yet maintain an existing network management structure.

2. Description of the Related Art

The advance of indoor controlling technology along with the ever-growing public attention on home networks has led to the development of an increasing number of home network control techniques. In line with the development of home network control techniques, there is a rapidly increasing demand for efficiently managing devices connected to a home network, e.g., monitoring states of the devices or determining performances of the devices.

In general, Simple Network Management Protocol (SNMP), which is widely used for managing a network, allows a network manager to analyze a device to be managed and to take appropriate measures to handle the device to be managed by accessing a management information base (MIB) of the device to be managed and varying settings regarding the MIB. Here, the MIB is a database of a collection of information entities regarding the device to be managed, and the information entities are referred to as objects. The MIB is embodied as a hierarchical tree structure of the objects.

Figure 1:
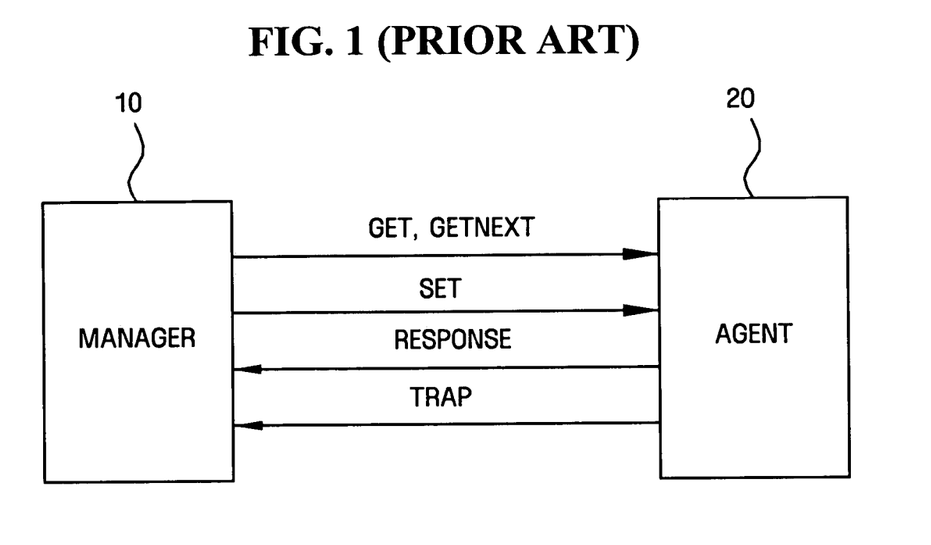
FIG. 1 is a block diagram of a conventional network management apparatus.

FIG. 1 is a block diagram of a conventional network management apparatus.

Referring to FIG. 1, the network management apparatus includes an agent 20 installed in a device to be managed and processing a plurality of pieces of information created or updated by the device as MIB objects, and a manager 10 installed in a device for managing the device to be managed, providing an interface via which an administrator can examine the state of a network, analyzing the device to be managed, and taking appropriate measures to handle the device to be managed according to the analysis results.

The manager 10 may obtain MIB objects regarding the state and operation time of the device to be managed through an operation 'get' or 'getNext'. Particularly, due to the hierarchical tree structure, the operation 'getNext' is used in obtaining a lower-level MIB object of a pertinent MIB object. The manager 10 may manipulate the objects of the MIB of the device to be managed through an operation 'set', thereby controlling the device to be managed.

The agent 20 performs an operation 'trap' to respond to the operation 'get', 'getNext' or 'set performed by the manager 10 or to notify the manager 10 of extraordinary circumstances occurring to the device to be managed, such as malfunction or breakdown of the device to be managed.

Figure 2:
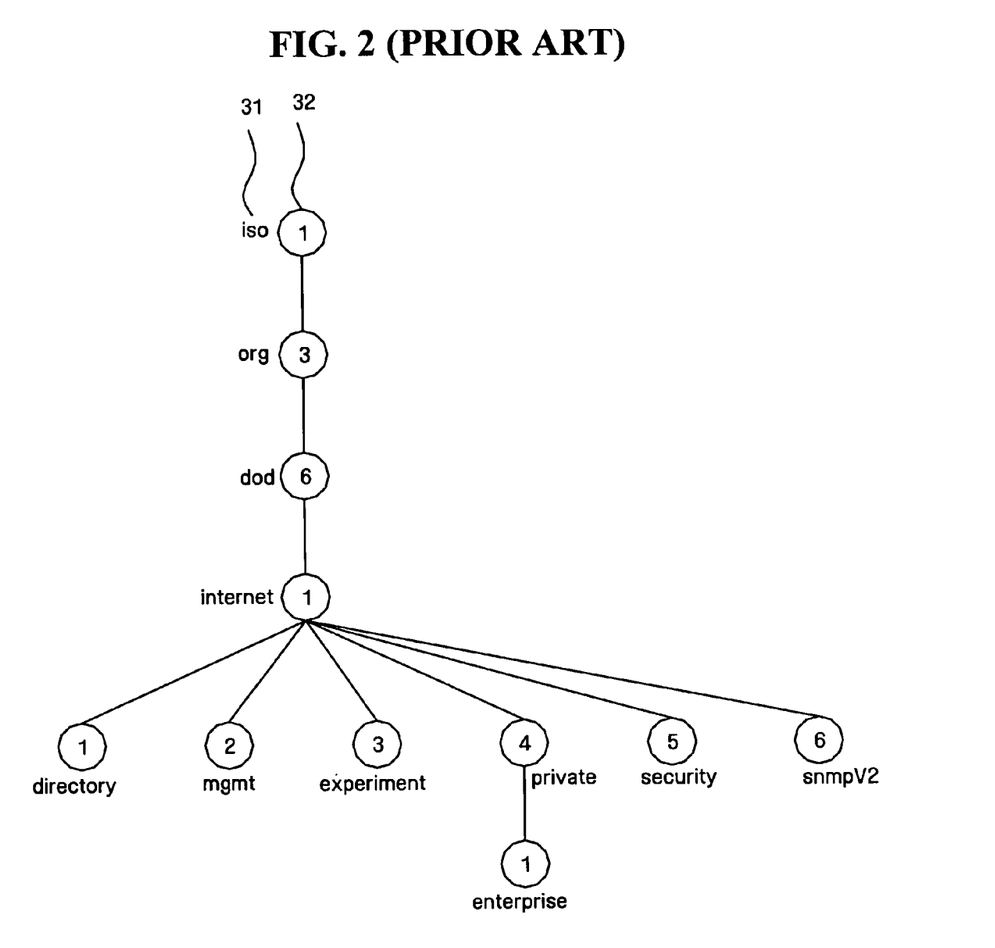
FIG. 2 is a diagram illustrating the structure of a typical management information base (MIB)

FIG. 2 is a diagram illustrating the structure of a typical MIB.

Referring to FIG. 2, an MIB includes a plurality of objects 31 (i.e., objects 'iso', 'org', and 'dod', 'internet', and etc) and a plurality of object instances 32 (i.e., '1', '3', '6', '1', and etc).

An administrator may issue a request for a predetermined object of the MIB to an agent 20 of a device to be managed or may set the predetermined object to a predetermined value by using a manager 20. The administrator may access the predetermined object according to an object identifier (OID) mapped to the predetermined object. An OID may be comprised of a string of a plurality of object instances, as illustrated in FIG. 2. For example, if the administrator attempts to access, for example, the object 'internet', the administrator may have to reference an OID (1.3.6.1) comprised of object instances '1', '3', '6', and '1'.

MIB objects are classified as standard MIB objects and extended MIB objects. Standard MIB objects are MIB objects that can be applied in common to various types of devices, while extended MIB objects are device-specific MIB objects assigned by a manufacturer at the manufacturing time of the device. MIB objects are given different OIDs from one another. Each manufacturer may extend an existing MIB by creating MIB objects for various devices under an object 'enterprise' of the existing MIB according to the types and the purposes of use of the devices and assigning different OIDs to the created MIB objects. Extended MIB objects, which are enterprise-specific and device-specific, are prescribed and published by the Internet Assigned Number Authority.

Standard MIB objects are MIB objects that can be applied in common to various devices. Thus, it is relatively easy to manage standard MIB objects. However, when devices having their own MIBs are connected to a network, it is difficult to change an OID system used in an existing MIB to reflect changes made to the existing MIB due to the connection of the devices to the existing MIB because the MIBs of the devices have different structures.

In addition, the requirements to standardize MIBs of a plurality of devices in a network and to manage an entire OID system in the network make it difficult to manage a dynamic network, such as a home network including a considerable number of devices of various types.

Therefore, it is necessary to develop a network management method or apparatus which can make MIBs of devices added dynamically to a network accessible while maintaining the management of the network.

Japanese Patent Laid-Open Gazette No. 1999-205320 discloses a network management method in which an agent operates on a single virtual device supporting an entire MIB and responds to a request for access to an MIB issued by an SNMP manager. In this method, however, it is difficult to manage devices connected dynamically to a network.

SUMMARY OF THE INVENTION

The present invention provides a network management apparatus and method which can enable an MIB of a device to be managed to be easily accessible by dynamically extending an existing MIB when the device to be managed has been connected to the network.

According to an aspect of the present invention, there is provided a network management apparatus including a device connection management unit determining whether to extend a predetermined MIB according to an OID of a device connected to a network, and a virtual MIB connection unit creating an object 'virtual' in the predetermined MIB according to the determination results provided by the device connection management unit, creating a virtual object for the device under the object 'virtual', assigning a serial number to the virtual object for the device according to a time in which the device has been connected to the network, and redefining the OID of the device according to the serial number.

According to another aspect of the present invention, there is provided a network management apparatus including an MIB management unit creating an MIB for a device and defines an OID for the MIB, and a control unit transmitting the OID to a device for managing a network when the device has been connected to the network.

According to still another aspect of the present invention, there is provided a network management method including determining whether to extend a predetermined MIB according to an OID for an MIB of a device, creating an object 'virtual' in the predetermined MIB according to the determination results, creating a virtual object for the device under the object 'virtual', and assigning a serial number to the virtual object for the device according to a time in which the device has been connected to a network, and redefining the OID of the device according to the serial number.

According to a further aspect of the present invention, there is provided a network management method including creating an MIB for a device and defining an OID for the MIB, and transmitting the OID to a device for managing a network when the device has been connected to the network.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of this invention are shown. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 3:
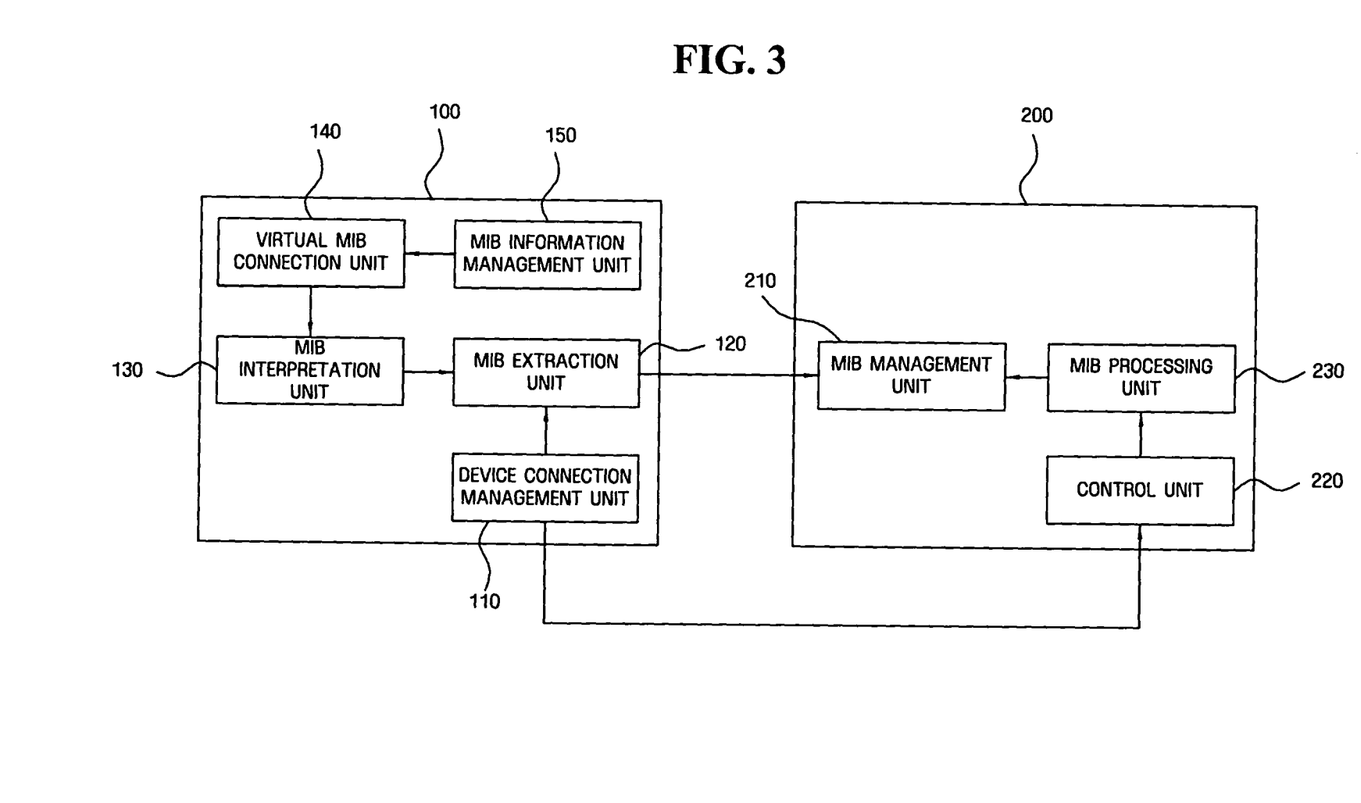
FIG. 3 is a block diagram of a network management apparatus according to an exemplary embodiment of the present invention.
Figure 4:
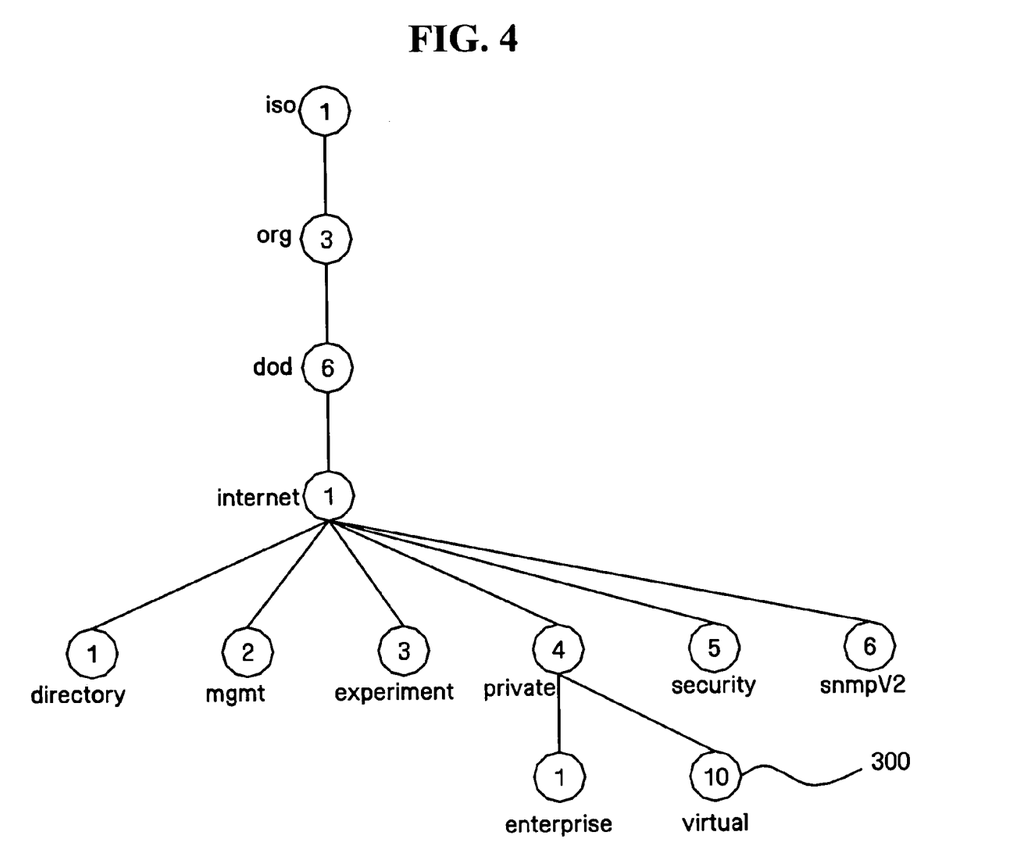
FIG. 4 is a diagram illustrating the structure of an MIB including an object 'virtual' according to an exemplary embodiment of the present invention.

FIG. 3 is a block diagram of a network management apparatus according to an exemplary embodiment of the present invention.

Referring to FIG. 3, the apparatus includes a manager 100 and an agent 200. The manager 100 determines whether to extend an MIB of a pertinent device to be managed to an MIB object virtually created according to an OID root value of the device. The agent 200 is installed in the device to be managed and sets the root of the OID of the device to a predefined value.

In general, an MIB object of the device to be managed can be accessed via a predefined OID assigned to the device to be managed. In general, the OID of the device to be managed is determined by the manufacturer. Therefore, devices of the same type may be assigned different OIDs if they are not manufactured by the same manufacturer, and devices of different types may also be assigned different OIDs even if they are manufactured by the same manufacturer. Thus, it is necessary to prevent the device to be managed from sharing the same OID with other devices by assigning an OID to the device to be managed according to OIDs assigned to the other devices.

In the present exemplary embodiment, OIDs to be assigned to different devices are created so that their roots are set to a predefined value. For this, the manager 100 creates an object 'virtual' under an object 'private' of the existing MIB, creates a plurality of virtual objects under the object 'virtual' for a plurality of devices when the devices are connected to a network, and sequentially assigns a plurality of consecutive serial numbers to the virtual objects according to the order in which the devices are connected to the network. Then, OID root values of the devices are replaced with the serial numbers assigned to the virtual objects corresponding to the devices by the manager 100, and the manager 100 can recreate OIDs of the devices according to the replacement results.

Therefore, in the present exemplary embodiment, even when a plurality of devices to be managed use the same OID system, it is possible to differentiate the devices from one another according to a plurality of serial numbers assigned to the devices by the manager 100. Thus, when creating OIDs for MIBs of the devices, there is no need to determine whether the OIDs conflict with one another.

The agent 200 includes an MIB management unit 210 creating an MIB for the device to be managed and creates an OID for the MIB of the device to be managed, a control unit 220 transmitting a response message to the manager 100 when there is a call from the manager 100, and an MIB processing unit 230 processing managing changes to the MIB of the device to be managed under the control of the control unit 220.

The MIB management unit 210 may set an OID root of the device to be managed to a predefined value that can be commonly used as OID root values of other devices. In the present exemplary embodiment, the MIB management unit 210 sets to '1' the root of the OID of the device to be managed. However, the MIB management unit 210 may also set the root of the OID of the device to be managed to a value other than 1 depending on network configurations. Further to the root value of 1, the MIB management unit 210 may also assign lower-level values of the root value sequentially in a predetermined order, the lower-level values defining the remaining digits of the OID of the device.

In other words, the MIB management unit 210 may sequentially assign serial numbers starting from '1' for various layers.

The MIB created by the MIB management unit 210 may have a hierarchical tree structure illustrated in FIG. 2, and each of a plurality of objects of the MIB may include OID information, name information, description information, data type information, and object value information. Here, OID information specifies an OID of an MIB object, name information specifies the name of the MIB object, description information specifies functions provided by the MIB object, data type information specifies the data type of the MIB object (for example, if the MIB object has another MIB object as its child node, the data type information specifies that the MIB object is a node, and otherwise, the data type information specifies that the MIB object is a leaf), and the object value information specifies the value of the MIB object.

The control unit 220 performs a predetermined function in response to the manager 100's call and transmits/receives messages required for changing or updating the value of a predetermined MIB object to/from the manager 100. In addition, if the device to be managed has been newly connected to the network, the control unit 220 may communicate with the manager 100 in a broadcast or multicast manner, thereby notifying the manager 100 that the device to be managed has been connected to the network. In this case, the control unit 220 transmits the OID root value of the device to be managed to the manager 100.

If the manager 100 does not have the function to assign a serial number to a virtual object created for the device to be managed according to the OID root value of the device to be managed and to replace the OID root value of the device to be managed with the serial number, the control unit 220 may add an Internet Protocol (IP) address of the device to be managed to the OID root value of the device to be managed and then transmit the addition result to the manager 100. In this case, the manager 100 can identify the device to be managed according to the IP address included in the addition result transmitted by the control unit 220 of the agent 200.

For example, if the IP address of the device to be managed is 'www.xxx.yyy.zzz' and the OID of the device to be managed is '1.2.3.4', the control unit 220 may add 'www.xxx.yyy.zzz' and '1.2.3.4' and transmit the addition result, i.e., 'www.xxx.yyy.zzz.1.2.3.4', to the manager 100.

If the value of an object of the MIB of the device to be managed is altered or updated, the MIB processing unit 230 may process and manage the alteration or updating result. In other words, if a request for a predetermined MIB object is issued by the manager 100, the MIB processing unit 230 may return the value of the predetermined MIB object to the manager 100 and may alter or update the value of the predetermined MIB object upon the request of the manager 100.

The manager 100 includes a device connection management unit 110 determining whether the device to be managed has been newly connected to the network and determining whether to extend an MIB depending on the device that has been newly connected to the network, an MIB extraction unit 120 extracting the MIB of the device to be managed, an MIB interpretation unit 130 determining whether the MIB of the device to be managed is valid, a virtual MIB connection unit 140 extending the existing MIB by attaching the MIB of the device to be managed under the object 'virtual' of the existing MIB according to the determination results provided by the device connection management unit 110, and an MIB information management unit 150 managing the extended MIB.

The device connection management unit 110 manages a list of devices connected to the network and may transmit a response message to the agent 200 in response to a management search message that is transmitted by the agent 200 to search for the manager 100. The device connection management unit 110 may control the virtual MIB connection unit 140 to sequentially assign a plurality of consecutive serial numbers to a plurality of devices when the devices are connected to the network. In detail, when the device to be managed has been newly connected to the network, the control unit 220 of the device to be managed announces that the device to be managed has been connected to the network and then transmits the OID root value of the device to be managed to the manager 100. If the OID root value of the device to be managed to the manager 100 is the same as a predefined value, the device connection management unit 110 controls the virtual MIB connection unit 140 to assign a serial number to a virtual object corresponding to the device to be managed and replace the OID root value of the device to be managed with the serial number assigned to the virtual object corresponding to the device to be managed, thereby extending the existing MIB.

However, if the existing MIB cannot be extended according to the OID root value of the device to be managed, the control unit 220 of the device to be managed may add the IP address of the device to be managed to the OID root value of the device to be managed and then transmit the addition result to the manager 100. Thus, the device connection management unit 110 can identify the device to be managed by the IP address included in the addition result transmitted by the control unit 220 of the device to be managed.

The MIB extraction unit 120 extracts the MIB of the device to be managed from the MIB management unit 210 of the device to be managed, and the MIB interpretation unit 130 determines whether the MIB of the device to be managed is valid. For example, the MIB interpretation unit 130 may determine whether each of the objects of the MIB of the device to be managed is valid or not according to presence or absence of values corresponding to data type information, name information, and description information of each of the objects of the MIB and the OID of the device to be managed.

The virtual MIB connection unit 140 creates an object 'virtual' in the existing MIB.

Thereafter, if the device connection management unit 110 determines that the device to be managed has been connected to the network, a virtual object corresponding to the device to be managed may be created under the object 'virtual', and the device connection management unit 110 may control the virtual MIB connection unit 140 to assign serial numbers to virtual objects according to a connection order in which devices to be managed are connected to the network.

For example, if there are devices newly connected to the network, the device connection management unit 110 may control the virtual MIB connection unit 140 to create the object 'virtual' under an object 'private' of the existing MIB, create a plurality of virtual objects for the respective devices under the object 'virtual', sequentially assign a plurality of consecutive serial numbers of, for example, 1, 2, 3, . . . , to the virtual objects according to the order in which the devices are connected to the network, and replace OID root values of the devices with the serial numbers.

Figure 5:
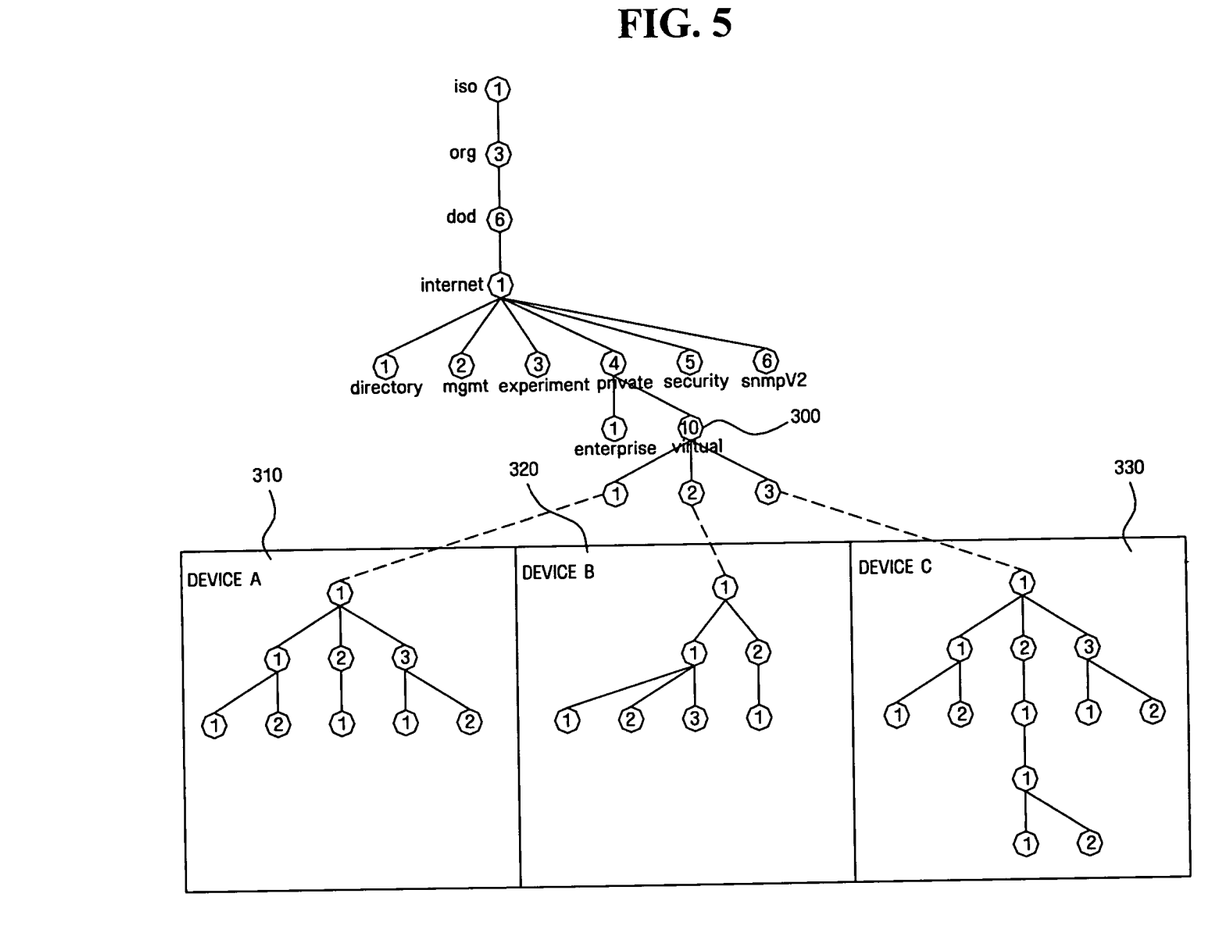
FIG. 5 is a diagram illustrating a plurality of consecutive serial numbers assigned to a plurality of virtual objects created for devices to be managed under an object 'virtual' of an MIB and OID root values of the devices, the OID replaced with the serial numbers according to an exemplary embodiment of the present invention.

In detail, if there are devices newly connected to the network, the virtual MIB connection unit 140 creates an object 'virtual' (300) under an object 'private' of the MIB of FIG. 2, as illustrated in FIG. 5.

Assuming that the devices newly connected to the network are devices A (310), B (320), and C (330), the virtual MIB connection unit 140 creates virtual objects for the devices A (310), B (320), and C (330) under the object 'virtual' (300) and assign serial numbers of 1, 2, and 3 to the virtual objects. Thereafter, the virtual MIB connection unit 140 may replace OID root values of the devices A (310), B (320), and C (330) with the serial numbers assigned to the virtual objects corresponding to the devices A (310), B (320), and C (330).

Accordingly, an OID of the device A (310) is changed from '1.3.1' to '1.3.6.1.4.10.1.3.1', an OID of the device B (320) is changed from '1.1.2.' to '1.3.6.1.4.10.2.1.2', and an OID of the device C (330) is changed from '11.2.1.1.2' to '1.3.6.1.4.10.3.2.1.1.2'. The OIDs of the devices A (310), B (320), and C (330) have '1.3.6.1.4.10' in common, and the remaining portions of the OIDs of the devices A (310), B (320), and C (330) may be assigned by the virtual MIB connection unit 140. The root value (i.e., a value of 1) of the original OID (1.3.1) of the device A (310) is replaced with the serial number (i.e., a value of 1) assigned to the virtual object corresponding to the device A (310) by the virtual MIB connection unit 140, the root value (i.e., a value of 1) of the original OID (1.1.2) of the device B (320) is replaced with the serial number (i.e., a value of 2) assigned to the virtual object corresponding to the device B (320) by the virtual MIB connection unit 140, and the root value (i.e., a value of 1) of the original OID (1.2.1.1.2) of the device C (330) is replaced with the serial number (i.e., a value of 3) assigned to the virtual object corresponding to the device A (310) by the virtual MIB connection unit 140. Therefore, if the OID root values of the devices A (310), B (320), and C (330) are the same as the predefined value, e.g., 1, the manager 100 may create virtual objects for the devices A (310), B(320), and C(330), sequentially assign a plurality of consecutive serial numbers to the virtual objects, and replace the OID root values of the devices A (310), B (320), and C (330) with the serial numbers, thereby preventing the OIDs of the devices A (310), B (320), and C (330) from conflicting with one another after the expansion of the existing MIB.

The MIB information management unit 150 may process not only information regarding the structure of the existing MIB before extended but also information regarding the structure of the existing MIB after extended. Therefore, the administrator can identify the OID of the device to be managed according to the information provided by the MIB information management unit 150 and thus can access the MIB of the device to be managed.

A network management method using the network management apparatus according to an exemplary embodiment of the present invention will now be described in detail.

Figure 6:
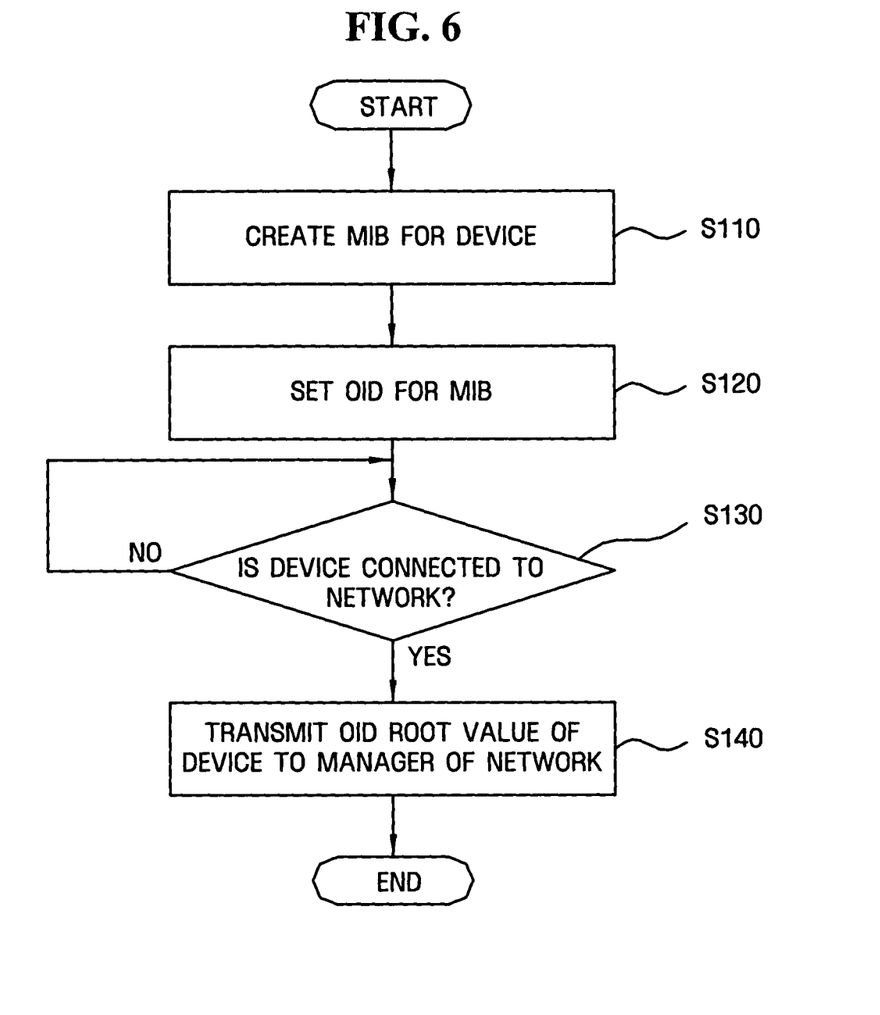
FIG. 6 is a flowchart illustrating a method of creating an MIB for a device according to an exemplary embodiment of the present invention.

FIG. 6 is a flowchart illustrating a method of creating an OID for an MIB of a device to be managed according to an exemplary embodiment of the present invention, which is performed by the agent 200 of FIG. 3.

Referring to FIG. 6, in operation S110, the MIB management unit 210 creates an MIB of the device to be managed. In operation S120, the MIB management unit 210 sets an OID for the MIB of the device to be managed. The MIB management unit 210 may create the OID for the MIB of the device to be managed so that the root of the OID can be set to a predefined value, e.g., 1.

The OID root value of the device to be managed can be used by the manager 100 to determine whether to assign the OID of the device to be managed to a virtual object created for the device to be managed according to the OID root value of the device to be managed. If the manager 100 does not have the function to assign the OID of the device to be managed to the virtual object created for the device to be managed according to the OID root value of the device to be managed, the MIB management unit 210 may add an IP address of the device to be managed to the OID of the device to be managed, thereby enabling the manager 100 to identify the device to be managed according to the IP address included in the addition result.

Thereafter, in operation S140, if the device to be managed is determined in operation S130 to be connected to a network, the control unit 220 announces that the device to be managed has been connected to the network and transmits the OID root value of the device to be managed to the manager 100.

Figure 7:
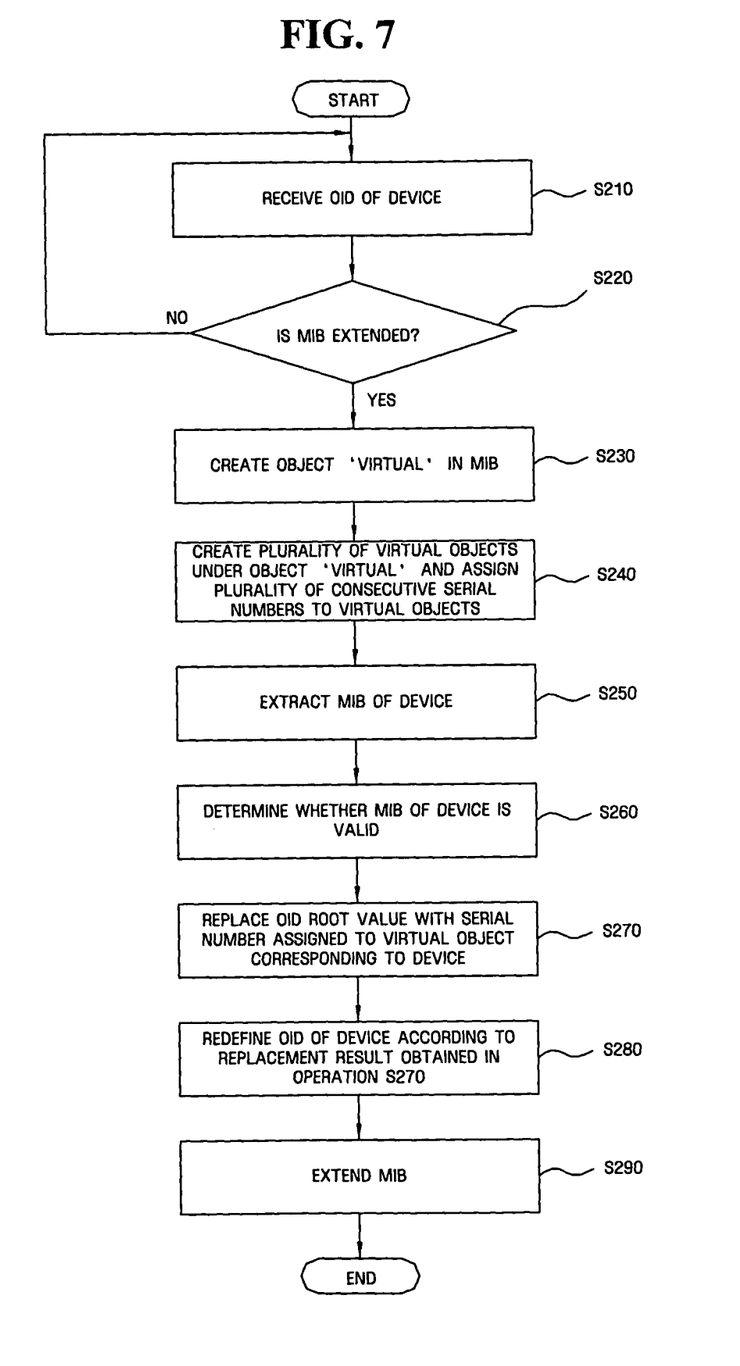
FIG. 7 is a flowchart illustrating a method of dynamically extending an MIB for a device connected to a network according to an exemplary embodiment of the present invention.

FIG. 7 is a flowchart illustrating a method of adding an OID created using the method of FIG. 6 to an existing MIB according to an exemplary embodiment of the present invention.

Referring to FIG. 7, in operation S210, the device connection management unit 110 of the manager 100 receives an OID root value of the device to be managed from the control unit 220 of the agent 200. In operation S220, it is determined whether to extend the existing MIB according to whether the OID root value is the same as a predefined value. In detail, if the OID root value is the same as the predefined value, it is determined to extend the existing MIB. Otherwise, it is determined not to extend the existing MIB. Here, the predefined value may be 1.

In operation S230, if the OID root value is determined in operation S220 to be the same as the predefined value, the device connection management unit 110 controls the virtual MIB connection unit 140 to create an object 'virtual' in the existing MIB and to create a virtual object for the device to be managed under the object 'virtual'. In operation S240, the device connection management connection unit 110 also controls the virtual MIB connection unit 140 to assign a serial number to the virtual object corresponding to the device to be managed according to a time in which the device to be managed has been connected to the network.

Thereafter, in operation S250, the device connection management unit 110 controls the MIB extraction unit 120 to extract an MIB of the device to be managed. The device connection management unit 110 may also extract the OID of the device to be managed when extracting the MIB of the device to be managed.

In operation S260, the MIB interpretation unit 130 determines whether the MIB of the device to be managed is valid according to presence or absence of values corresponding to data type information, name information, and description information of each of the objects of the MIB and the OID of the device to be managed.

In operation S270, if the MIB of the device to be managed is determined in operation S260 to be valid, the virtual MIB connection unit 140 replaces the OID root value of the device to be managed with the serial number assigned to the virtual object corresponding to the device to be managed. In operation S280, the virtual MIB connection unit 140 redefines the OID for the device to be managed according to the replacement result obtained in operation S270.

In operation S290, the existing MIB is extended by attaching the MIB of the device to be managed to the existing MIB according to the redefined OID of the device to be managed, and information regarding the extended MIB is managed by the MIB information management unit 150.

Therefore, the manager 100 can access any of a plurality of objects of the MIB of the device to be managed according to the information managed by the MIB information management unit 150.

If the manager 100 does not have the function to assign a serial number to the virtual object created for the device to be managed according to the OID root value of the device to be managed, the agent 200 may add an IP address of the device to be managed to the OID of the device to be managed and transmit the addition result to the manager 100.

Therefore, the manager can identify the device to be managed according to the IP address included in the addition result transmitted by the agent 100 and can extend the existing MIB according to the addition result transmitted by the agent 100.

A network management apparatus and method of the present invention may provide the following advantages.

First, it is possible to dynamically extend an existing network management structure by connecting a device to a network with fewer modifications to an existing network management structure.

Second, a device connected to a network can be efficiently managed by obtaining an MIB of the device without previously knowing an MIB for each device connected to the network.

Third, it is possible to reduce overhead when managing a home network including a considerable number of devices of various types by enabling the devices to be differentiated from one another by their respective OIDs using a standard MIB.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A network management apparatus comprising:
   a hardware processor;
   a device connection management unit, under control of the processor, which receives an object identifier (OID) of a device connected to a network, the OID of the device having an OID root value, and determines whether to extend a predetermined management information base (MIB) according to whether the OID root value of the received OID is the same as a predetermined value; and
   a virtual MIB connection unit which, if the device connection management unit determines that the predetermined MIB is to be extended, creates an object in the predetermined MIB, creates a virtual object for the device under the object in the predetermined MIB, assigns a serial number to the virtual object for the device according to a time in which the device has been connected to the network, replaces the OID root value of the received OID of the device with the serial number and redefines the OID of the device according to the serial number, to thereby extend the predetermined MIB.

2. The network management apparatus of claim 1, wherein the device connection management unit determines whether to extend the predetermined MIB according to an Internet Protocol (IP) address included in the OID of the device.

3. The network management apparatus of claim 1 further comprising:
   an MIB extraction unit which extracts an MIB of the device according to the determination results provided by the device connection management unit;
   an MIB interpretation unit which determines whether the MIB of the device is valid; and
   an MIB information management unit which manages the MIB extended by the virtual MIB connection unit.

4. A network management apparatus comprising:
   a hardware processor;
   a management information base (MIB) management unit, under control of the processor, which creates an MIB for a device to be managed and defines an object identifier (OID) for the MIB; and
   a control unit which transmits the OID to a network manager device for managing a network if the control unit determines that the device to be managed has been connected to the network,
   wherein the management information base (MIB) management unit sets an OID root value of the object identifier (OID) to be the same as a predefined value set in the network manager device if the network manager device can extend a predetermined management information base (MIB) according to the OID root value, and
   wherein the control unit adds an Internet Protocol (IP) address of the device to the OID root value and transmits the OID having the added IP address of the device to the network manager if the network manager cannot extend the predetermined MIB according to the OID root value.

5. A network management method comprising:
   receiving an object identifier (OID) for a management information base (MIB) of a device connected to a network, the OID having an OID root value;
   determining whether to extend a predetermined management information base (MIB) according to whether the OID root value of the received OID is the same as a predetermined value;
   if it is determined that the predetermined MIB is to be extended, creating an object in the predetermined MIB, creating a virtual object for the device under the object in the predetermined MIB, and assigning a serial number to the virtual object for the device according to a time in which the device has been connected to a network; and
   replacing the OID root value of the received OID of the device with the serial number and redefining the OID of the device according to the serial number.

6. The network management method of claim 5, wherein the determining comprises determining whether to extend the predetermined MIB according to an Internet Protocol (IP) address of the device included in the OID of the device.

7. The network management method of claim 5, further comprising:
   extracting an MIB of the device according to the result of the determining; and
   determining whether the MIB of the device is valid.

8. A network management method comprising:
   creating a management information base (MIB) for a device to be managed and defining an object identifier (OID) for the MIB; and
   transmitting the OID to a network manager device for managing a network if it is determined that the device to be managed has been connected to the network,
   wherein the defining of the object identifier (OID) includes setting an OID root value of the OID to be the same as a predefined value set in the network manager device if the network manager device can extend a predetermined management information base (MIB) according to the OID root value, and
   wherein the transmitting the OID includes adding an Internet Protocol (IP) address of the device to the OID root value, and transmitting the OID having the added IP address of the device to the network manager if the network manager cannot extend the predetermined MIB according to the OID root value.

* * * * *